United States Patent [19]

Peach

[11] Patent Number: 5,028,054
[45] Date of Patent: Jul. 2, 1991

[54] IDLER ROLLER BEARING AND SEAL

[75] Inventor: Samuel O. Peach, Saltillo, Miss.

[73] Assignee: FMC Corporation, Chicago, Ill.

[21] Appl. No.: 554,055

[22] Filed: Jul. 13, 1990

[51] Int. Cl.⁵ .............................................. F16J 15/48
[52] U.S. Cl. ..................................... 277/057; 277/65; 384/480
[58] Field of Search ............... 277/57, 65; 384/480, 384/482, 484, 485

[56] References Cited

U.S. PATENT DOCUMENTS

| | | | |
|---|---|---|---|
| 1,986,621 | 1/1935 | Bott | 384/484 |
| 2,347,953 | 5/1944 | Katcher | 384/484 |
| 2,617,698 | 11/1952 | Gaines | 384/482 |
| 2,639,954 | 5/1953 | Potter | 384/484 |
| 3,021,161 | 2/1962 | Rhoads et al. | 227/65 |
| 3,144,280 | 8/1964 | Sorenson | 277/65 |
| 3,363,911 | 1/1968 | McKinven Jr. | 277/65 |
| 4,332,710 | 6/1982 | Iwai et al. | 277/57 |

FOREIGN PATENT DOCUMENTS

| | | | |
|---|---|---|---|
| 2421379 | 11/1975 | Fed. Rep. of Germany | 384/484 |
| 1191672 | 5/1990 | United Kingdom | 277/57 |

Primary Examiner—William A. Cuchlinski, Jr.
Assistant Examiner—Daniel G. DePumpe
Attorney, Agent, or Firm—Douglas W. Rudy; Richard B. Megley

[57] ABSTRACT

A seal and bearing assembly is provided to seal the end of a conveyor roller. The seal is made up of an outer lip seal of a pliable material, a contact seal, a metallic labyrinth element and an interlocking labyrinth pliable material seal inboard of the outer lip seal.

4 Claims, 1 Drawing Sheet

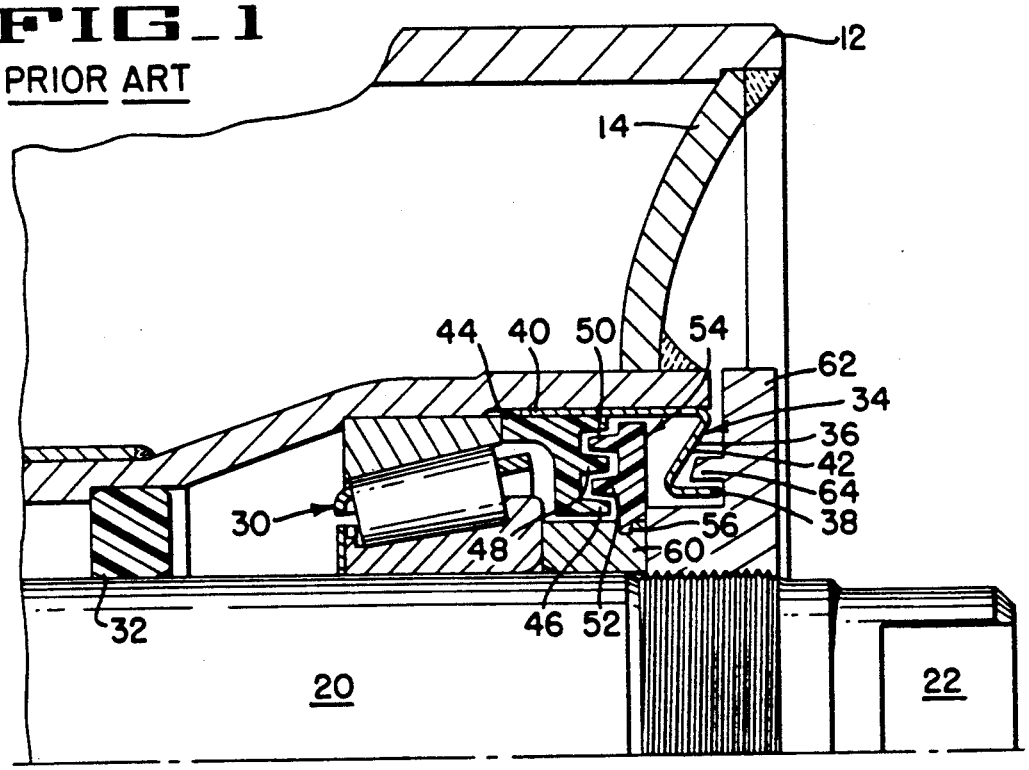
FIG_1 PRIOR ART
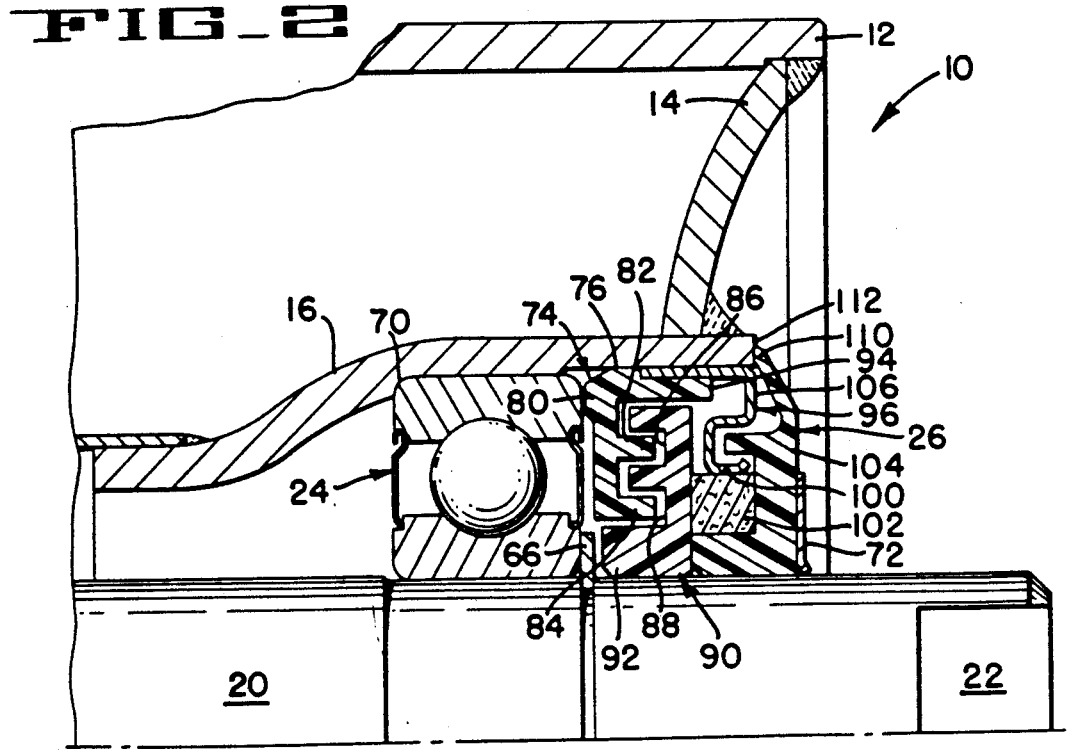
FIG_2

IDLER ROLLER BEARING AND SEAL

BACKGROUND OF THE INVENTION

1. Field of the Invention

This invention has to do with roller bearings and seals for use in conveyor rollers of the type used to support a conveyor belt for the transport of loose friable materials.

2. Description of Related Art

Conveyor rollers or idler rollers as they are sometimes called, work in harsh environments such as open pit mines, quarries, sand and gravel classification operations and the like. Normally they support long runs of conveyor that is used to transport materials from a point of origin to a processing station. The bearings of such idler rollers are expected to tolerate rather severe service for long periods of time—sometimes up to several years.

In order to accomplish this goal the bearings of the idler rollers are shielded from the intrusion of contaminants by seals in the outboard end of the idler rollers.

Numerous seal designs have been used over the many years of use of idler rollers. A whole panoply of designs have been developed, each which claims to have advantages over others. But advances in seal design due to materials availability, wear characteristics and more sophisticated seal molding and fabricating techniques continue to improVe the art in this field.

To the best of the inventor's current knowledge the device that most closely relates to the instant invention is shown as FIG. 1 of the drawing Figures. The device is manufactured by FMC Corporation and is known as the "70,000 Series". It's details will be discussed further on.

SUMMARY OF THE INVENTION

This invention has to do with a means for and apparatus used to seal the bearing containing ends of an idler roller. The idler roller has an axial cavity for accepting an axle shaft as well as a bearing and a seal assembly. The bearing is a roller bearing having an inner race carried on the axle shaft and an outer race carried and supported by the inner diameter of the idler roller.

A labyrinth seal fronted by a felt material seal and a metallic "reversed-S" retainer is carried between the bearing and the outboard end of the idler roller. Finally, a contact seal, retained in place by a "push nut" completes the idler roll bearing and seal arrangement.

BRIEF DESCRIpTION OF THE DRAWING FIGURES

In the drawings attached hereto:

FIG. 1 is a cross sectioned and partially broken away idler roll showing a bearing and seal assembly of the prior art.

FIG. 2 is a cross sectioned and partially broken away idler roll showing a bearing and seal assembly representative of the instant invention.

DESCRIpTION OF THE pREFERRED EMBODIMENT

Looking first at FIG. 2, a description of the idler roller bearing and seal may be helpful in the appreciation of the invention.

Both the prior art idler roller and the instant invention idler roller, generally 10, include an outer shell 12 which is the normal exterior surface of the idler roller contacting, for instance, a load supporting conveyor belt (not shown). The outer shell is supported by a web 14 apart from and generally concentric with a center tube 16. The center tube 16 may be of various designs but for purposes of this disclosure it should be recognized that the center tube, or more properly, the ends of the center tube are of a diameter great enough to accommodate the bearing and seal and are generally of a diameter greater than the diameter of the inboard portions of the center tube. The center tube ends may be of more massive structure, as shown in FIG. 2, than the inboard sections of the center tube.

An axle 20 passes through the idler roller on the major axis of the idler roller. It is carried in the center tube, 16 and extends outboard from each of the two ends of the idler roller a sufficient distance to allow attachment to a support frame rudimentarily shown as 22.

The specific area of concern of this invention has to do with the bearing and seal assemblies respectively generally 24 and 26.

Before the nuances of the bearing and seal are discussed it may be appropriate to discuss FIG. 1. This figure shows the prior art Series 70,000 design of the FMC Corporation. It is a state of the art bearing and seal widely used in idler rollers.

In FIG. 1 the outer shell and center tube are functional identical with those of FIG. 2 but there are several differences. Inboard of the roller bearing 30 is an elastomeric seal 32 which is designed to keep the bearing lubricant, typically a grease, in the bearing area of the center tube.

In order to prevent contamination from reaching the bearing, the seal, generally 34 is provided outboard of the bearing. The seal comprises three elements including an outer Z-shaped seal case 36 which is a cylindrical unit having a wall 40 that is in contact with the inner diameter of the expanded end zone of the center tube. The wall 40 continues inwardly in what may be termed a web 42 which ultimately turns axially toward the outboard end of the center tube in what may be thought of as an inner lip 38. Of course virtually all of the seal components are circumferential around the axle as would be expected.

An inboard labyrinth seal element 44 abuts the roller bearing 30, the wall surface of the center tube (the same wall surface that the wall 40 of the seal case 36 contacts) and the interior of the wall 40 of the seal case 36. This inboard labyrinth seal element 44 has two circumferential grooves 46 and 48 which cooperate with projections 50 and 52 of an outboard labyrinth seal element 54 to form a labyrinth seal. The outboard labyrinth seal element 54 also includes circumferential projection 56 carried in a groove in a circumferential bearing spacer block 60.

The bearing spacer block 60 is urged against the bearing by a compression/seal nut 62, having a projection 64 that extends into the area of the seal case 36 between the web 42 and the inner lip 38 of the seal case. This provides a rudimentary labyrinth seal. The nut 62 is screwed onto the axle until it contacts the bearing spacer block 60 and maintains all the inboard elements in place.

An improved design, and the invention disclosed herein is set forth in FIG. 2. In this embodiment a sealed bearing, generally 24, in this case a ball bearing type bearing assembly is retained on the axle 20 by means of a circumferential bearing retaining snap ring 66 which is carried in a circumferential groove in the axle. The inboard largest circumference shoulder 70 of the bearing 24 abuts a complimentary step in the inside of the expanded end portion of the center tube. The bearing is thus held in position on the axle 20 between the step and the bearing retaining snap ring 66.

Outboard of the bearing is the seal generally 26. This is a multi part design, including two distinct labyrinth sections, a felt contact seal and an outer lip seal is retained on the axle by a "push nut" type star washer 72 having an inside diameter to accommodate the axle 20 and retain the seal elements.

The seal elements, starting from the inboard location adjacent the bearing generally 24, include a first labyrinth element 74 which has an outermost circumference 76 that contacts the inner surface of the expanded end portion of the center tube. A projection 80 is formed on the first labyrinth element on the surface of the element adjacent the bearing 24. Circumferential projections 82 and 84 project outwardly from the main body of the first labyrinth element into grooves 86 and 88 of the second labyrinth element 90.

The second labyrinth element 90 is carried on and is in circumferential contact with the axle 20. It includes a significant base portion 92 from which the main body extends outwardly. The main body has first and second grooves 86 and 88 formed therein and terminates inboard from an extension 94 of the first labyrinth element 74.

Inboard of the extension 94 the seal case generally 96 is located. It is a close or tight fit against the inside diameter of the expanded end of the center tube and has its inboard end generally contacting the outermost circumference 76 of the first labyrinth element 74.

The seal case, generally 96, in cross section of the full circumferential element, is a "reverse S-shape" that provides a labyrinth element in its own right. The innermost circumference 100 defines a circular aperture that will abut and accommodate a contact seal 102, generally of felt or other fiber. This felt seal 102 will also contact the outboard side of the body of the second labyrinth element 90 on the innermost surface of the felt seal.

The two remaining surfaces of the felt seal contact an outer lip seal 104 of pliable material. It has been found that a Teflon/molydisulfide filled urethane an appropriate pliable material. The outer lip seal is generally a large diameter disc having a central aperture to accommodate the axle 20. The inboard side, that is the side facing the bearing, has two circumferential cavities defining a receiver for the felt seal 102 and the inner most circumference 100 of the seal case and a second cavity for accommodating a web portion 106 of the seal case. The outer boundary of this second cavity is defined by a lip 110. This lip 110 contacts the circumferential end surface 112 of the expanded end of the center tube. The lip 110 has an outer circumference, as shown in FIG. 2 that is greater than the outer circumference of the seal case, generally 96 and the labyrinth element 90. The lip seal 104 therefore contacts the axle 20 and the end surface 112 of the center tube simultaneously. The outer lip seal, as well as the second labyrinth element and to some extent the felt seal 102 are held in place on the shaft by the push nut 72. These four elements may, and preferably do contact each other and will remain relatively stationary on the axle 20.

The first labyrinth element 74 and the seal case will rotate with the center tube and outer shell of the idler roller. Rotating and non-rotating seal elements will contact each other only at the juncture of the innermost circumference 100 of the seal case and the felt seal and where the lip 110 meets the end of the center tube 112.

The seal assembly presented herein may be grease filled to further assist in preventing the migration of contaminants from outside the end of the center tube to the bearing. Its assembly on the axle is quick and easy and expensive machining of the axle has been avoided.

Thus it can be seen that there has been provided a seal and a bearing and seal assembly that provides good and improved sealing over what is known in the art. It is contemplated that the following claims would be construed to cover nuances of design that would be considered minor design nuances by a person having skill in the bearing/seal art.

What is claimed is:

1. A rotation motion accommodating seal for use in preventing the passage of a contaminant from one side of the seal to the other side of the seal comprising:
    a first labyrinth element having an outermost circumference and a first and a second circumferential projection inboard of said outermost circumference;
    a second labyrinth element having a central aperture defined by a significant base portion and a first and a second circumferential groove which accommodate said first and said second circumferential projections;
    a seal case having a circumference and having a circumferential wall, said wall in contact with said first labyrinth element and having a cross sectional shape defining a reversed S-shape with a web connecting said seal case wall to an innermost circumference of said seal case;
    a contact seal having a surface contacting said innermost circumference of said seal case;
    a circumferential lip sea having a cavity for accommodating said contact seal and said innermost circumference of said seal case and having a second cavity for accommodating said web of said seal case and having a circumferential lip greater than the circumference of said seal case.

2. The invention in accordance with claim 1 wherein said circumferential projections of said first labyrinth element extend into said grooves of said second labyrinth element without mutual contact between said projections and said grooves.

3. The invention in accordance with claim 2 wherein said first labyrinth element includes a circumferential projection extending from said element opposite to the direction of said circumferential projections.

4. A rotational motion accommodating seal for use in an assembly including an axle portion and a center tube supported by a bearing on said axle, said center tube having a circumferential end surface, said seal comprising:
    a first labyrinth element carried inside said tube and in contact therewith, said first labyrinth having first and second projections;
    a second labyrinth element carried on said axle and having first and second circumferential grooves which accommodate said first and second circumferential projections of said first labyrinth element;
    a contact seal in contact with said second labyrinth element; and
    a circumferential lip seal carried on said axle outboard of said second labyrinth element having a cavity for accommodating said contact seal, said lip seal having a circumferential lip in contact with said circumferential end surface of said center tube.

* * * * *